(12) United States Patent
Wang et al.

(10) Patent No.: US 10,664,022 B2
(45) Date of Patent: May 26, 2020

(54) ATTACHMENT STRUCTURE AND DISPLAY DEVICE

(71) Applicant: HON HAI PRECISION INDUSTRY CO., LTD., New Taipei (TW)

(72) Inventors: Na Wang, Shenzhen (CN); Cheng-Fa Chung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/101,695

(22) Filed: Aug. 13, 2018

(65) Prior Publication Data
US 2019/0377390 A1    Dec. 12, 2019

(30) Foreign Application Priority Data
Jun. 6, 2018  (CN) .......................... 2018 1 0576635

(51) Int. Cl.
  *G06F 1/18* (2006.01)
  *G06F 1/16* (2006.01)
  *G02F 1/1333* (2006.01)

(52) U.S. Cl.
  CPC ........ *G06F 1/181* (2013.01); *G02F 1/133308* (2013.01); *G06F 1/1601* (2013.01); *G02F 2001/133317* (2013.01)

(58) Field of Classification Search
  CPC ... G02F 1/133308; G02F 2001/133317; G06F 1/181; G06F 1/1601
  See application file for complete search history.

(56) References Cited

U.S. PATENT DOCUMENTS

| | | | | |
|---|---|---|---|---|
| 6,741,299 B2* | 5/2004 | Fukayama | ........ | G02F 1/133308 349/58 |
| 8,811,004 B2* | 8/2014 | Liu | .......................... | F16B 2/22 349/58 |
| 10,324,329 B2* | 6/2019 | Yang | .................... | G02B 6/0088 |
| 2012/0287368 A1* | 11/2012 | Que | ...................... | G02B 6/0086 349/58 |
| 2014/0176854 A1* | 6/2014 | Shin | .................. | G02F 1/133308 349/58 |
| 2014/0285746 A1* | 9/2014 | Huang | .............. | G02F 1/133512 349/58 |
| 2014/0285978 A1* | 9/2014 | Suzuki | ..................... | H05K 7/14 361/747 |
| 2014/0340875 A1* | 11/2014 | Hayashi | ............ | G02F 1/133308 362/97.1 |

(Continued)

FOREIGN PATENT DOCUMENTS

| | | |
|---|---|---|
| CN | 102681234 A | 9/2012 |
| JP | 10-44247 A | 2/1998 |

*Primary Examiner* — Nidhi Thaker
(74) *Attorney, Agent, or Firm* — ScienBiziP, P.C.

(57) ABSTRACT

A structure for attaching portions of a display device which provides connection strength and aesthetic enhancement includes a first locking component, a second locking component, and a connecting component. A first connecting groove is formed on the first locking component and a second connecting groove is formed on the second locking component. The first and second connecting grooves are opposing but interconnected. The connecting component is made of a silicon gel analogue, and is injected into the first and second connecting grooves before being stiffened in place by a curing process.

12 Claims, 3 Drawing Sheets

(56) References Cited

U.S. PATENT DOCUMENTS

| | | | | |
|---|---|---|---|---|
| 2015/0146113 A1* | 5/2015 | Kasai | .................. | G02B 6/0018 348/794 |
| 2015/0146403 A1* | 5/2015 | Lee | .................. | G02F 1/133308 361/809 |
| 2015/0170582 A1* | 6/2015 | Shimizu | ............ | G02F 1/133308 345/206 |

\* cited by examiner

ATTACHMENT STRUCTURE AND DISPLAY DEVICE

FIELD

The subject matter generally relates to an attachment structure and a display device.

BACKGROUND

A television includes a display screen and a back plate. The display screen and the back plate may be connected by hooks or screws. However, such hooks may takes up a lot of space, and screws may cause appearance problem.

Thus, there is room for improvement in the art.

BRIEF DESCRIPTION OF THE DRAWINGS

Implementations of the present technology will now be described, by way of example only, with reference to the attached figures.

DETAILED DESCRIPTION

Figure 1:
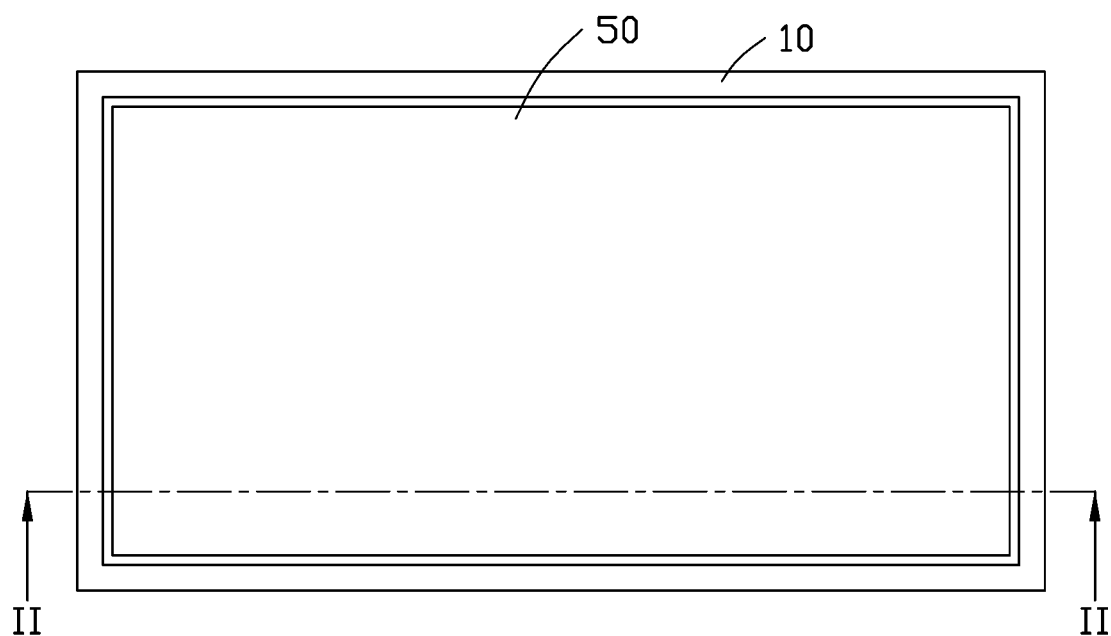
FIG. 1 is a top plan view of a first embodiment of a display device of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain portions may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

Figure 2:
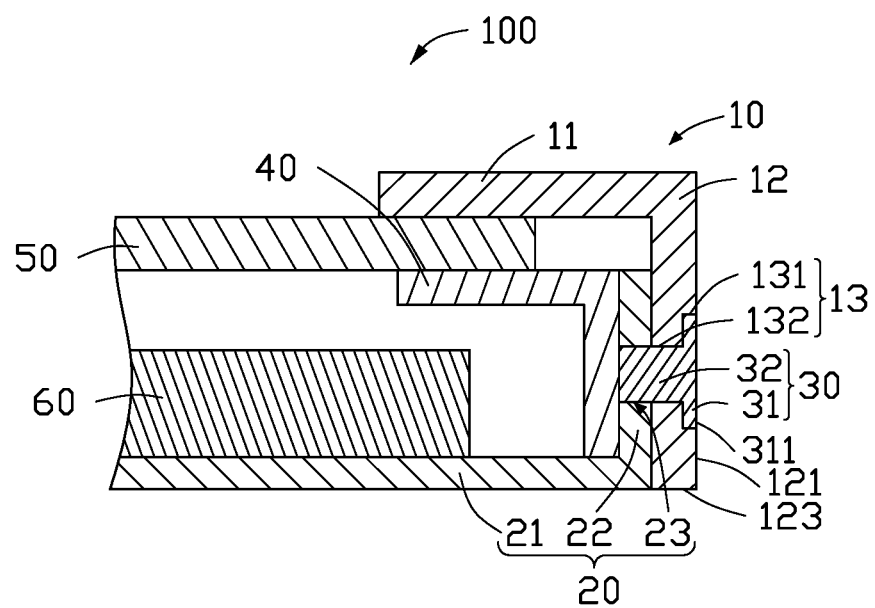
FIG. 2 is a cross-sectional view of the display device along line II-II of FIG. 1.

FIGS. 1-2 illustrate a first embodiment of a display device 100. The display device 100 includes an attachment structure 110, a middle frame 40, a display screen 50, and an optical module 60. The middle frame 40 is formed on the attachment structure 110. The display screen 50 is formed on the middle frame 40. The optical module 60 is formed on the attachment structure 110 and faces the display screen 50.

The attachment structure 110 includes a first locking component 10, a second locking component 20, and a connecting component 30. The connecting component 30 is made of silicon gel analogue. The first locking component 10 and the second locking component 20 are connected together by the connecting component 30.

In at least one embodiment, the first locking component 10 is a front frame of a television and the second locking component 20 is a backplane.

In at least one embodiment, the first locking component 10 includes an inwardly extending frame 11 and a side frame 12. In at least one embodiment, the inwardly extending frame 11 and the side frame 12 are integrally formed together. In another embodiment, the side frame 12 is fixed on the inwardly extending frame 11. In at least one embodiment, the inwardly extending frame 11 is perpendicular to the side frame 12.

The side frame 12 includes a first side surface 121, a second side surface 122, and a bottom surface 123. The second side surface 122 is parallel to the first side surface 121. The bottom surface 123 is perpendicular to the first side surface 121 and the second side surface 122 and faces away from the inwardly extending frame 11.

The first locking component 10 further includes a first connecting groove 13. The first connecting groove 13 runs through the first locking component 10. Further, the first connecting groove 13 runs through the first side surface 121 and the second side surface 122.

The first connecting groove 13 includes an open groove 131 and a receiving groove 132. The open groove 131 faces the outside world. The receiving groove 132 is connected to the open groove 131.

In at least one embodiment, the first connecting groove 13 is substantially T-shaped. The open groove 131 runs through the first side surface 121. The receiving groove 132 is perpendicularly connected to the open groove 131. The open groove 131 has an inner diameter that is larger than an inner diameter of the receiving groove 132.

The second locking component 20 includes a main board 21 and a side board 22.

In at least one embodiment, the main board 21 and the side board 22 are integrally formed together. In another embodiment, the side board 22 can be connected to the main board 21 by screws or adhesive.

In at least one embodiment, the side board 22 is perpendicular to the main board 21. The main board 21 is perpendicular to the side frame 12. The side board 22 is parallel to the side frame 12.

The side board 22 includes a third side surface 221. The third side surface 221 is parallel to and faces the second side surface 122.

A second connecting groove 23 is defined on the side frame 22. The second connecting groove 23 is recessed from the third side surface 221 toward the interior of the side plate 22. The second connecting groove 23 faces the first connecting groove 13.

In at least one embodiment, the second connecting groove 23 runs through the side board 22.

The connecting component 30 is installed or inserted in the first connecting groove 13 and the second connecting groove 23. The connecting component 30 is or will be connected to the first connecting groove 13 and the second connecting groove 23 by interference fit.

The connecting component 30 includes a first connected portion 31 and a second connected portion 32 integrally formed together with the first connected portion 31. The first connected portion 31 is received in the open groove 131. The second connected portion 32 is received in the receiving groove 132 and the second connecting groove 23.

The connecting component 30 is a solid-type silicon gel analogue filler. When the solid-type silicon gel analogue filler is injected into the first connecting groove 13 and the second connecting groove 23 by a heated propulsion device (not shown), the solid-state silicon gel analogue filler is heated and become a liquid-type silicon gel analogue filler. The liquid-type silicon gel analogue filler is cured to form the connecting component 30 when the temperature of the liquid-type silicon gel analogue filler falls.

In at least one embodiment, the connecting component 30 is substantially T-shaped. The first connected portion 31 includes an exposed surface 311. The exposed surface 311 is flush with the first side surface 121.

Decorative patterns (not shown) can be formed on the exposed surface 311 by the heating propulsion device when the solid-state silicone filler is heated and injected into the first connecting groove 13 and the second connecting groove 23. The patterns on the exposed surface 311 can optimize the appearance of the first locking component 10.

The middle frame 40 is formed on the main board 21.

The display screen 50 is formed on the middle frame 40 and touches the inwardly extending frame 11.

In another embodiment, the middle frame 40 can be omitted from the display device 100. In this case, the display screen 50 is formed on the inwardly extending frame 11.

The display screen 50 can be a liquid crystal display or a plasma panel. In at least one embodiment, the display screen 50 is a liquid crystal display.

The optical module 60 provides light to illuminate the display screen 50.

The optical module 60 is fixed on the main board 21 and faces the display screen 50.

Figure 3:
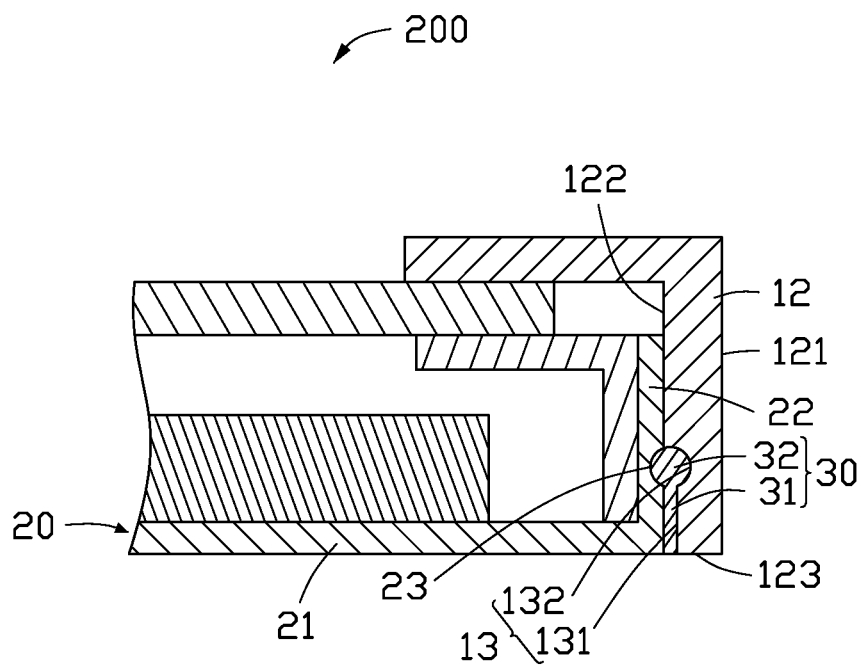
FIG. 3 is a cross-sectional view of another embodiment of a display device of the present disclosure.

FIG. 3 illustrates another embodiment of a display device 200. Structure of the display device 200 is similar to the structure of the display device 100 in the first embodiment. Differences between the display device 200 and the display device 100 are that the first connecting groove 13 does not run through the second side surface 122. The second connecting groove 23 does not run through the side board 22. The open groove 131 runs through the bottom surface 123. The receiving groove 132 and the second connecting groove 23 are substantially hemispherical. The receiving groove 132 and the second connecting groove 23 define a hollow sphere. The exposed surface 311 is flush with the bottom surface 123. The connecting component 30 is substantially lollipop-shaped.

In another embodiment, the shapes of the first connecting groove 13 and the second connecting groove 23 can have other shapes.

With the above configuration, because the first locking component 10 and the second locking component 20 are connected together by the connecting component 30 when cured using a silicon gel analogue: (1) the first locking component 10 and the second locking component 20 are tightly connected together by the connecting component 30; and (2) patterns can be formed on the exposed surface 311 by the heating propulsion device to optimize the appearance of the first locking component 10.

The embodiments shown and described above are only examples. Many details are often found in the art such as the other features of a display device. Therefore, many such details are neither shown nor described. Even though numerous characteristics and advantages of the present technology have been positioned forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims. It will therefore be appreciated that the embodiments described above can be modified within the scope of the claims.

What is claimed is:

1. An attachment structure comprising: a first locking component, wherein a first connecting groove is formed on the first locking component; the first connecting groove comprises an open groove and a receiving groove; the open groove is on an exterior surface of the first locking component, and wherein the first locking component comprises an inwardly extending frame and a side frame fixed on the inwardly extending frame, the side frame comprises a first side surface, a second side surface, and a bottom surface, the second side surface is parallel to the first side surface, and the bottom surface is perpendicular to the first side surface and the second side surface and faces away from the inwardly extending frame; and the open groove extends through the second side surface and the bottom surface, the receiving groove extends through the second side surface; a second locking component, wherein a second connecting groove is formed on the second locking component, the second connecting groove faces the first connecting groove; the second connecting groove face the receiving groove; and the second connecting groove does not extend through the second locking component; and a connecting component, wherein the connecting component is baseball shaped, the connecting component fills in the first connecting groove and the second connecting groove, a material of the connecting component is a silicon gel analogue, wherein the connecting component comprises a first connected portion and a second connected portion, wherein the first connected portion includes an exposed surface, the exposed surface is flush with the bottom surface.

2. The attachment structure of claim 1, wherein the connecting component is connected to the first connecting groove and the second connecting groove by interference fit.

3. The attachment structure of claim 1, wherein the second connected portion is integrally formed together with the first connected portion, the first connected portion is received in the open groove, and the second connected portion is received in the receiving groove and the second connecting groove.

4. The attachment structure of claim 1, wherein the open groove extends through the second side surface and the bottom surface, the receiving groove extends through the second side surface.

5. The attachment structure of claim 1, wherein the receiving groove and the second connecting groove are substantially hemispheric.

6. The attachment structure of claim 1, wherein some patterns are formed on the exposed surface.

7. A display device comprising: an attachment structure, the attachment structure comprising: a first locking component, wherein a first connecting groove is formed on the first locking component; the first connecting groove comprises an open groove and a receiving groove, the open groove is on an exterior surface of the first locking component, and wherein the first locking component comprises an inwardly extending frame and a side frame fixed on the inwardly extending frame, the side frame comprises a first side surface, a second side surface, and a bottom surface, the second side surface is parallel to the first side surface, and the bottom surface is perpendicular to the first side surface and the second side surface and faces away from the inwardly extending frame; and the open groove extends through the second side surface and the bottom surface, the receiving groove extends through the second side surface; a second locking component, wherein a second connecting groove is on the second locking component, the second connecting groove faces the first connecting groove; the second connecting groove faces the receiving groove; and the second connecting groove does not extend through the second locking component; and a connecting component, wherein the connecting component is baseball shaped, the connecting component fills in the first connecting groove and the second connecting groove, a material of the connecting component is a silicon gel analogue, wherein the connecting component comprises a first connected portion and a second connected portion, wherein the first connected portion includes an exposed surface, the exposed surface is flush with the bottom surface.

8. The display device of claim 7, wherein the first connecting groove is formed on the side frame; the second locking component comprises a main board and a side board formed on the main board, the second connecting groove is formed on the side board.

9. The display device of claim 8, wherein the display device comprises a middle frame formed on the main board and a display screen is formed on the middle frame, the display screen is touched with the inwardly extending frame.

10. The display device of claim 7, wherein the connecting component is connected to the first connecting groove and the second connecting groove by interference fit.

11. The display device of claim 7, wherein the second connected portion is integrally formed together with the first connected portion, the first connected portion is received in the open groove, and the second connected portion is received in the receiving groove and the second connecting groove.

12. The display device of claim 7, wherein some patterns are formed on the exposed surface.

* * * * *